June 12, 1962 R. H. BELL 3,038,410
AIRCRAFT FUEL PUMPS
Filed March 11, 1960
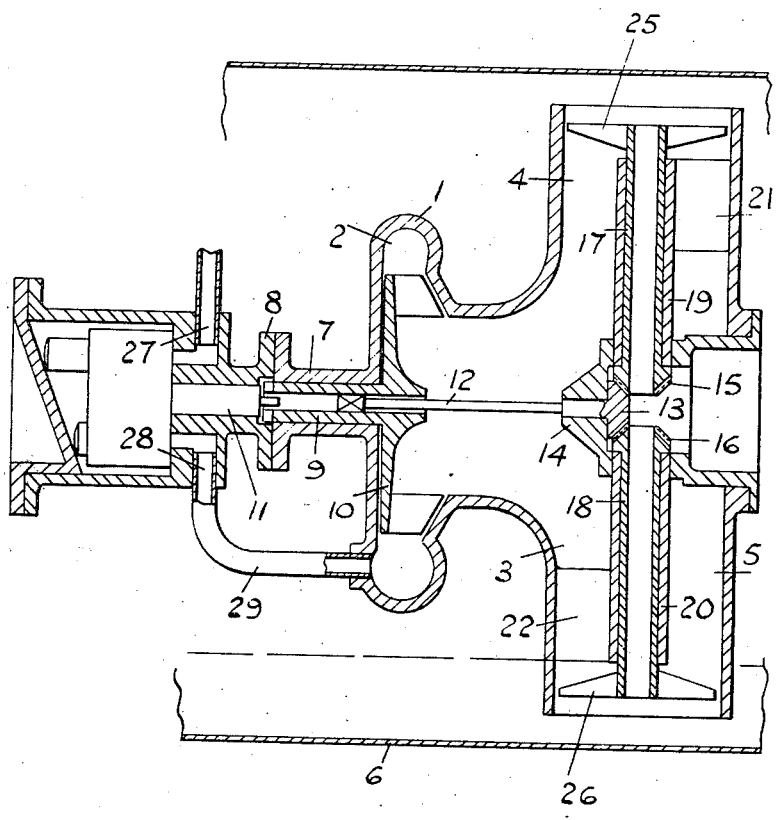
Inventor
R.H.Bell
By Glenn K. Downing Hubbell
Attys.

United States Patent Office 3,038,410
Patented June 12, 1962

3,038,410
AIRCRAFT FUEL PUMPS
Robert Henry Bell, Kings Heath, Birmingham, England, assignor to Joseph Lucas (Industries) Limited, Birmingham, England
Filed Mar. 11, 1960, Ser. No. 14,414
3 Claims. (Cl. 103—87)

This invention relates to so-called boost pumps for aircraft, that is to say pumps of the kind which are adapted to be mounted within the fuel tank of an aircraft for delivering fuel to a fuel pump associated with the engine of the aircraft.

The object of this invention is to provide such a pump in a convenient and efficient form.

A pump according to the invention comprises a hollow body part defining a pumping chamber which is in communication with a pair of oppositely directed and coaxial tubular inlets, a rotor in the form of an impeller in the pumping chamber, means for driving the rotor, a pair of co-axial hollow shafts extending within the inlets respectively, means for driving said hollow shafts from said rotor, and an additional impeller on each hollow shaft.

An example of the invention is illustrated in sectional side elevation in the accompanying drawing.

Referring to the drawing there is provided a hollow body part which includes a volute casing 1 defining a pumping chamber 2, and a T-shaped inlet section 3. The stem portion of the section 3 is secured to one side of the casing 1, whilst the head portion of the section 3 defines a pair of co-axial tubular inlets 4, 5 which extend radially from said stem portion to adjacent the top and bottom of a fuel tank 6 respectively. From the centre of the opposite side of the casing 1 extends an integral tubular and flanged boss 7 which is bolted, or otherwise secured to the body part 8 of a fluid actuated motor of the swash plate type. Within the boss 7 is a rotatable sleeve 9 on one end of which is mounted a pump impeller 10 situated within the chamber 2. Within the sleeve 9 are non-rotatably accommodated the adjacent ends of a pair of co-axial shafts 11, 12. The shaft 11 has a non-rotatable engagement with the rotor of the motor, whilst the shaft 12 extends through the stem portion of the section 3 and has a bevel pinion 13 mounted on its other end the part of the shaft 12 adjacent the pinion 13 being supported within a bearing 14 extending into the junction of the inlets 4, 5. The pinion 13 is in mesh wtih mitre gears 15, 16 formed at the inner and adjacent ends of a pair of co-axial hollow shafts 17, 18 which are each open at both ends as shown, and which extend concentrically within the pair of tubular inlets 4, 5 respectively.

The hollow shafts 17, 18 are rotatably mounted respectively within bearings 19, 20 carried by radial arms 21, 22, and a pair of additional impellers 25, 26 are mounted on the ends of the shafts 17, 18 respectively.

In use fuel serving as the motive fluid is supplied to the motor through an inlet 27 by an engine driven pump (not shown). As the motor rotates it drives the pump impeller 10, and the additional impellers 25, 26. One or both of the additional impellers 25, 26, depending upon the level of the fuel tank 6, serves or serve to supply fuel to the horizontally disposed stem portion of the section 3 from whence it is drawn axially into the pumping chamber 2 by the pump impeller 10, and then delivered through a tangential outlet to the fuel pump of the engine.

In order to prevent the fuel being utilised as the motive fluid for the motor from being heated to an undesirably high temperature, the outlet 28 of the motor may be connected through a pipe 29 to the outlet of the volute casing so that the motive fluid will be mixed with, and cooled by the fuel being fed by the boost pump to the engine fuel pump and to the engine driven pump for supplying the motor.

It will be understood that since the inlets 4, 5 extend to adjacent the top and bottom of the tank 6 respectively, one or other of the additional impellers 25, 26 will be submerged when the aircraft is in normal or inverted flight provided a small quantity of fuel remains in the tank 6. Moreover, due to the hollow nature of the shafts 17, 18 in the event of an air or other gas bubble occupying a position below the lowermost inlet, this gas can escape through the shafts 17, 18 thereby avoiding a vapour lock which might otherwise render the lowermost additional impeller incapable of supplying fuel to the stem portion of the inlet section 3.

Having thus described my invention what I claim as new and desire to secure by Letters Patent is:

1. A pump of the kind specified, comprising in combination, a hollow body including a pumping chamber of volute form, a duct extending axially from one side of, and communicating with, said pumping chamber, and a pair of coaxially aligned tubular inlets extending radially from opposite sides respectively of said duct, a rotatable main impeller situated within said pumping chamber, driving means connected to said main impeller, a pair of hollow shafts which are each open at both ends, and which are rotatably mounted within said hollow body in coaxial relationship with, and extending respectively into, said inlets, means operatively connecting said hollow shafts to said main impeller so that rotation of the latter by said driving means causes rotation of said hollow shafts, and a pair of additional impellers respectively secured to the outer ends of said hollow shafts.

2. A pump according to claim 1 and having a sleeve on one end of which said main impeller is formed, and which is rotatably mounted within said body at the side of said pumping chamber remote from said duct, and a motor constituting said driving means, and having a driving connection with said sleeve.

3. A pump according to claim 2, wherein the means operatively connecting said hollow shafts to said rotor comprise a rotatable shaft having one end situated within, and in driving engagement with, said sleeve, and bevel gearing interconnecting the other end of said rotatable shaft and the inner ends of said hollow shafts.

References Cited in the file of this patent
UNITED STATES PATENTS

| | | |
|---|---|---|
| 367,564 | Wade et al. | Aug. 2, 1887 |
| 921,118 | Kasley | May 11, 1909 |
| 1,586,978 | Dorer | June 1, 1926 |
| 2,223,592 | Barton et al. | Dec. 3, 1940 |
| 2,408,918 | Curtis | Oct. 8, 1946 |
| 2,792,192 | Wheeler | May 14, 1957 |

FOREIGN PATENTS

| | | |
|---|---|---|
| 782,533 | Great Britain | Sept. 11, 1957 |